Figure 1:
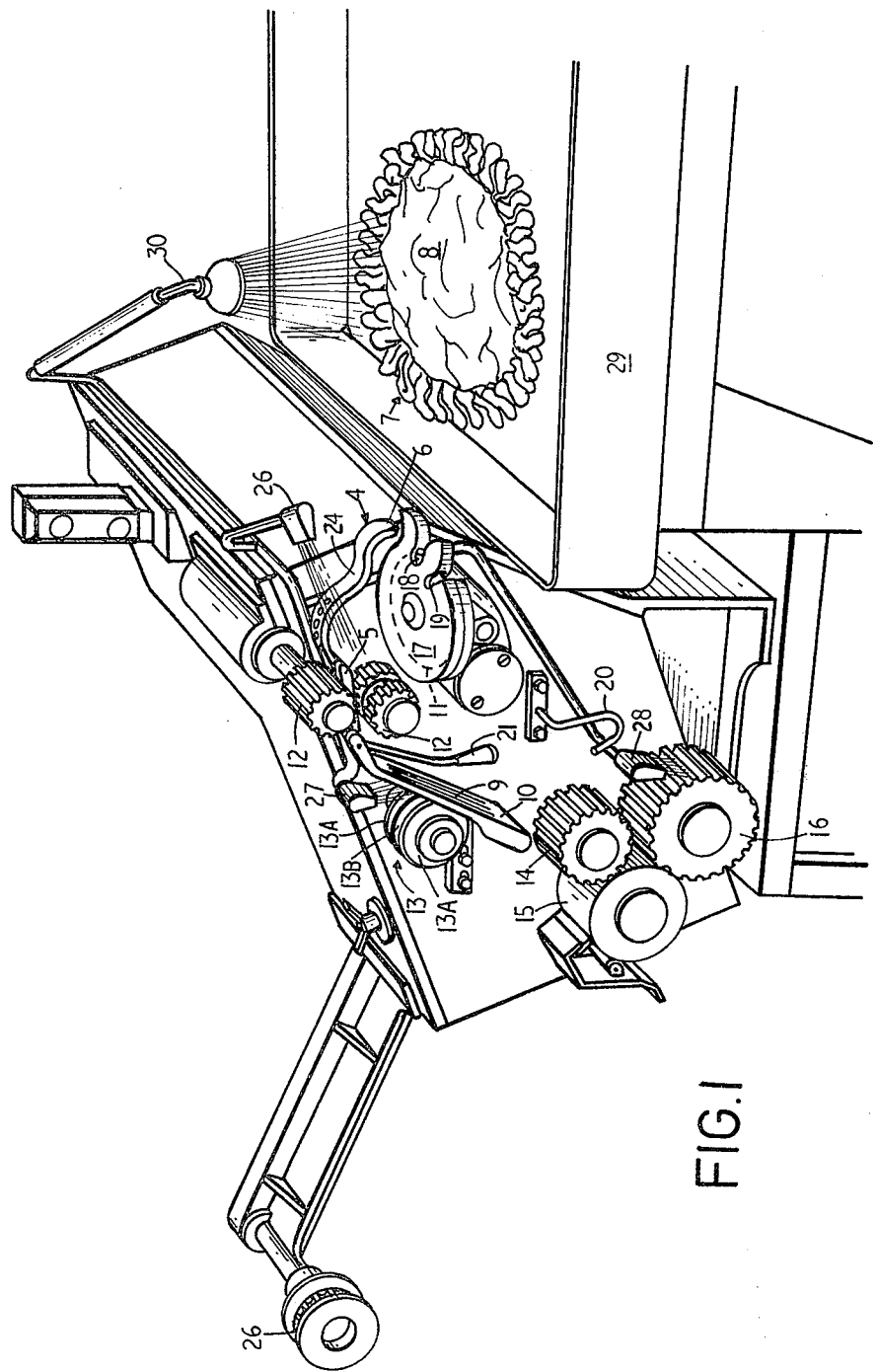

United States Patent [19]
Evers et al.

[11] 3,949,447
[45] Apr. 13, 1976

[54] SEPARATION OF ANIMAL INTESTINES

[75] Inventors: Roy James Evers, Cronulla; Darcy Glen Perrett, Peakhurst, both of Australia

[73] Assignee: Cyanamid Australia Pty. Limited, St. Leonards, Australia

[22] Filed: Oct. 29, 1974

[21] Appl. No.: 518,823

[30] Foreign Application Priority Data
Nov. 1, 1973  Australia............................. 5486/73

[52] U.S. Cl......................................... 17/61; 17/43
[51] Int. Cl.²........................................ A22C 17/14
[58] Field of Search............... 17/1 R, 43, 58, 61-63

[56] References Cited
UNITED STATES PATENTS

| | | | |
|---|---|---|---|
| 2,982,279 | 5/1961 | Pursley | 124/35 A |
| 3,009,454 | 11/1961 | Graham | 124/35 A |
| 3,037,238 | 6/1962 | Castelow | 17/43 |
| 3,290,722 | 12/1966 | Norks | 17/43 |
| 3,800,774 | 4/1974 | Troncoso | 124/35 A |
| 3,882,571 | 5/1975 | Evers et al. | 17/43 |

*Primary Examiner*—Louis G. Mancene
*Assistant Examiner*—Robert F. Cutting
*Attorney, Agent, or Firm*—Ladas, Parry, Von Gehr, Goldsmith & Deschamps

[57] ABSTRACT

Apparatus for separation of animal intestines. The apparatus performs automatically all stages of the separation of the gold beater strand of the small intestine from the stomach of a beast and also beats the separated strand so that the final product may be used without further processing. The small intestine tube is first severed from the small intestine and pulled over a horn member, the small intestine then being severed longitudinally and the upper portion of the severed tube then being slit into a number of strands, each of which is then beaten by rollers and fed over a final member of the apparatus for collection.

6 Claims, 3 Drawing Figures

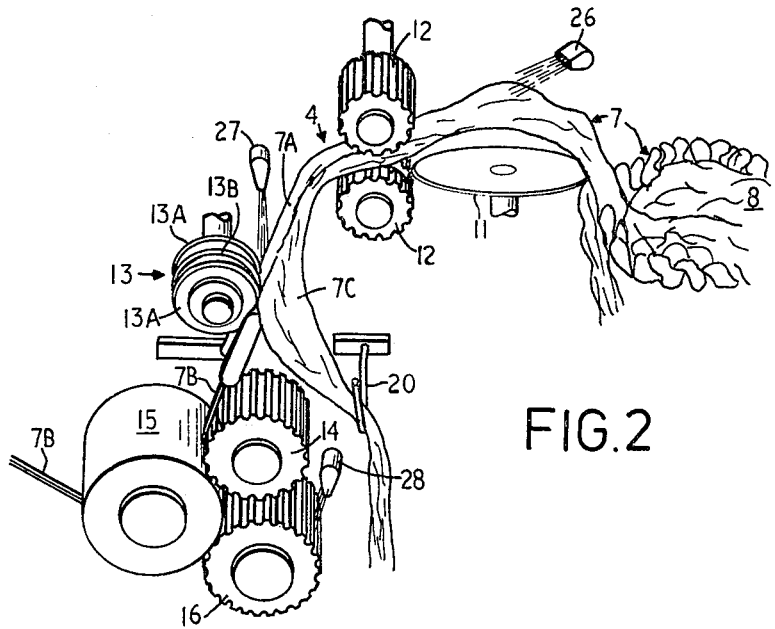
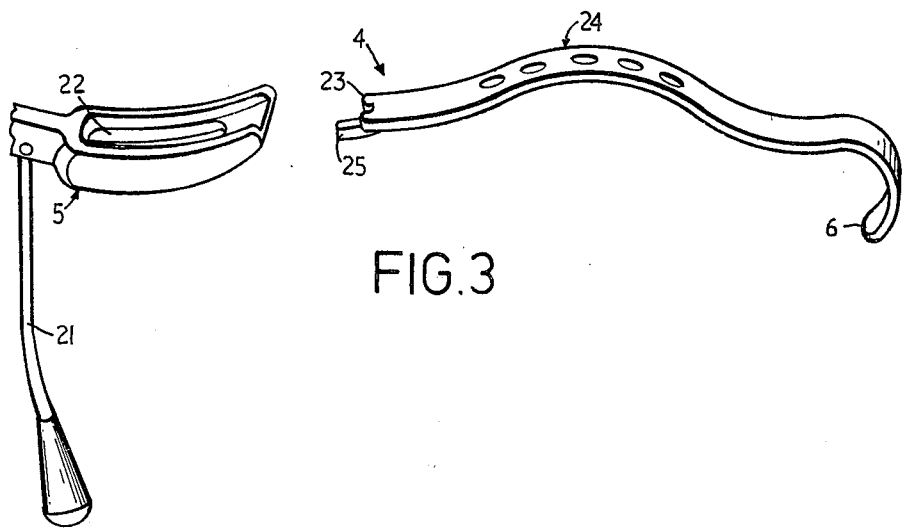

SEPARATION OF ANIMAL INTESTINES

This invention relates to apparatus for separating animal intestines. More particularly, the apparatus of this invention is adapted to first isolate from the stomach of a beast, such as a bullock, the tubular small intestine which is then slit longitudinally so that the part of the tubular small intestine containing the valuable gold beater strand of the serosa membrane is isolated from the remaining portion of the tube, said apparatus then slitting the isolated portion of the tube containing the gold beater strand into a plurality of separate strands, each of which is then rolled and beaten so that several gold beater strand threads are produced for collection.

Australian Patent Application No. 58397/73 discloses apparatus for isolating the tubular small intestine from the stomach of a beast. Once this intestine tube is isolated, it must be slit longitudinally to isolate the portion of the intestine tube containing the gold beater strand and this portion then separated into several separate threads. These latter operations may be performed manually with resultant loss of valuable portions of the intestine tube or may be performed by using a separate apparatus from that which was used to perform the initial operation. The use of several machines to perform the operations specified has obvious cost disadvantages.

Australian Patent Application No. 58440/73 relates to apparatus which performs the operations of effecting an initial isolation of the tubular small intestine from the stomach of a beast and then slitting longitudinally the isolated intestine tube so that the part of the tube containing the gold beater strand of the serosa membrane is isolated. When apparatus of Australian Patent Application No. 58440/73 is used for the stated purpose, there is provided for collection that part of the small intestine tube which contains the gold beater strand of the serosa membrane. The portion of the intestine tube so severed must be slit longitudinally so as to produce gold beater strand threads of suitable crosssection.

It is an object of this invention to provide apparatus which performs the following operations, (a) separation of the small intestine tube from the stomach of a beast, (b) severing the small intestine tube longitudinally so as to isolate that part of the tube containing the gold beater strand of the serosa membrane, and (c) slitting that part of the tube containing the gold beater strand into a plurality of separate strands which may then be beaten and rolled and collected from the apparatus.

Accordingly, this invention is one broad form comprises a horn member the leading end of which is solid and curved and the initial portion of which is adapted to receive therearound a portion of small intestine tube which has been initially severed from the stomach of a beast, said horn diverging after the solid leading end thereof into a plurality of rods, said rods being terminated and joined at their terminal points to a fixed bar, a rotary cutting device being positioned in relation to the curved solid leading end of said horn so as to sever the small intestine tube from the stomach portion of the beast as the tube is fed along the horn, there being a pair of pulling rollers positioned one either side of the solid portion of the horn adjacent the point where the horn diverges into a plurality of rods, said pulling rollers being adapted to engage the small intestine tube as it is fed over the solid portion of the horn and to pull the tube over said solid horn portion, the rods of said horn being adapted so that the portion of intestine tube fed thereover is expanded beyond its normal cross-sectional area, there being provided adjacent the terminal points of the rods a plurality of rotary cutting members located so that the outermost rotary cutting members effect an initial severing of the expanded small intestine tube so as to isolate therefrom that part of the tube containing the gold beater strand of the serosa membrane and the inner rotary cutting member or members sever the separated portion of tube containing the gold beater strand into a plurality of threads, two or more co-operating further rollers through which the severed threads may be fed so that the threads may be beaten between said co-operating rollers and the gold beater strand contained in each thread thus processed for collection.

A preferred form of the invention is illustrated in the accompanying drawings in which, FIG. 1 is a perspective view of the complete machine;

FIG. 2 is a perspective view of the moving parts only of the machine showing a small intestine tube being fed therethrough; and FIG. 3 is an exploded perspective view of the component parts of the horn member.

In the drawings apparatus according to this invention is depicted as having a horn member 4 and leading end of which is solid and curved and has an extremity 6 which is adapted to receive the portion of small intestine tube 7 which has been initially severed from the stomach 8 of a beast. Horn 4 diverges beyond the solid leading end extremity 5 thereof into a plurality of rods 9, said rods 9 being terminated and joined at their terminal points to a fixed bar 10. A rotary cutting device is positioned in relation to the curved solid leading end 6 of horn 4 so as to sever the small intestine tube 7 from the stomach portion 8 of the beast as tube 7 is fed along the horn 4. A pair of pulling rollers 12 positioned one either side of the solid portion of the horn adjacent the point where the horn diverges into a plurality of rods 9 is adapted to engage the small intestine tube 7 as it is fed over the solid portion 5 of the horn 4 and to pull the tube over said solid horn position 5. The rods 9 of said horn are located so that the portion 7A of intestine tube 7 fed thereover is expanded beyond its normal cross-sectional area. Adjacent rods 9 in the region of the rods near to the fixed bar 10 there is located a plurality of rotary cutting members 13. These cutting members are located so that the outermost rotary cutting members 13A effect an initial severing of the expanded small intestine tube so as to isolate therefrom that part of the tube 7 containing the gold beater strand of the serosa membrane and the inner rotary cutting member 13B is located so as to sever the separated portion of tube 7 containing the gold beater strand into a plurality of threads 7B. Three co-operating further rollers 14, 15 and 16 are provided through which the severed threads 7B are fed so that the threads 7B may be beaten between these cooperating rollers and the gold beater strand contained in each thread thus processed for collection.

The rotary cutting blade 11 which effects the initial severing of the small intestine tube 7 from the stomach 8 of a beast is provided with a housing 17, said housing having a recess 18 therein exposing part of the rotary blade 11 and that the curved leading end 6 of the horn should be located in relation to this recess 18 so that severing of the small intestine tube 7 is effected by the blade 11 rotating in this recess 18.

The housing has a second recess 19 provided therein in order that the stomach 8 of the beast with the small intestine tube 7 affixed might be introduced to the rotating blade 11 in this second recess 19 to effect an initial severing of the small intestine tube from the stomach. The portion of the small intestine tube 7 which is thus initially severed may be then fed over the rounded initial portion 6 of the horn 4.

A guard guide 20 is placed below the cutters 13 which effect severing of the small intestine tube itself 7 so that that part of the small intestine tube 7 which is not threaded by the innermost cutters 13 may be conducted away from the moving parts of the apparatus for collection below the rotary cutters. Waste roller/s may be used in the vicinity of this guard guide to assist in the removal of the unwanted portion of the small intestine tube. A weighted rod 21 is pivotally secured to the solid portion 5 of the horn 4. The rod helps guide the waste portion 7C of the small intestine tube 7 over the guard guide 20. It will be seen from FIG. 3 that the solid portion 5 of the horn 4 is provided with a longitudinal slot 22. This slot 22 is adapted to receive the trailing end 23 of the arcuately curved strip portion 24 of the horn 4. A small tongue 25 on the trailing end 23 assists in retaining the horn strip portion 24 in place. The strip 24 can thus be readily removed for cleaning.

The co-operating rollers 14, 15 and 16 through which the severed threads 7B are fed for beating comprise a smooth upper table roller 15 and a pair of toothed lower rollers 14 and 16, the first 14 of which is a control roller and the second 16 of which is a beater roller. It is further preferred that a final pick-off roller 26 (see FIG. 1) be provided so that the gold beater strand threads 7B may be fed over said final pick-off roller for collection. The roller 26 is drivably rotated from the main drive (not shown) of the machine.

It is essential that the speeds of the various rollers be controlled so that undesirable breaking of the small intestine tube 7 as it is fed through the apparatus is avoided. It has been found preferable that all rollers 12, 14 and 16 other than the smooth upper table roller 15 referred to above should be toothed rollers and that all rollers should be power driven.

In the preferred embodiment of this invention, the first pulling rollers 12 are 2 inches diameter rollers which rotate at approximately 360 r.p.m., the smooth upper table roller 15 is of 4 inches diameter and rotates at 200 r.p.m., the control roller 14 is of 3 inches diameter and rotates at 265 r.p.m. and the toothed beater roller 16 is of 4 inches diameter and is driven to rotate at 1,250 r.p.m. It has been found advantageous that tensioning be effected in the tube 7 as it is fed over the pronged section 9 of the horn 4. The roller diameters and rotations speeds indicated provide for approximately 200 lineal feet per minute of severed intestine tube to be fed through the co-operating rollers 14, 15 and 16 whereas approximately 185 lineal feet per minute are fed through the first pulling rollers 12.

In order to assist in the passage of the tube 7 through the machine, and also to wash away waste material, water jets are provided at the required locations 26, 27 and 28. The stomach to be treated is first placed in a trough 29 and a telescopic water jet 30 can be directed thereon for washing purposes.

It will be obvious to a man skilled in the art that other roller diameters and rotational speeds may be used to effect the object of this invention without departing from the inventive concept.

What we claim is:

1. Apparatus for the separation of animal intestines comprising a horn member the leading end of which is solid and curved and the initial portion of which is adapted to receive therearound a portion of small intestine tube which has been initially severed from the stomach of a beast, said horn diverging after the solid leading end thereof into a trailing end comprising a plurality of rods, said rods being terminated and joined at their terminal points to a fixed bar, a rotary cutting device being positioned in relation to the curved solid leading end of said horn so as to sever the small intestine tube from the stomach portion of the beast as the tube is fed along the horn, there being a pair of pulling rollers positioned on either side of the solid portion of the horn adjacent the point where the horn diverges into plurality of rods, said pulling rollers being adapted to engage the small intestine tube as it is fed over the solid portion of the horn and to pull the tube over said solid horn portion, the rods of said horn being adapted so that the portion of intestine tube fed thereover is expanded beyond its normal cross-sectional area, there being provided adjacent the terminal points of the rods a plurality of rotary cutting members located so that the outermost rotary cutting members effect an initial severing of the expanded small intestine tube so to isolate therefrom that part of the tube containing the gold beater strand of the serosa membrane and the inner rotary cutting member or members sever the separated portion of tube containing the gold beater strand into a plurality of threads, two or more co-operating further rollers through which the severed threads may be fed so that the threads may be beaten between said co-operating rollers and the gold beater strand contained in each thread thus processed for collection, and guide means being placed relative to the cutting members which effect longitudinal severing of the small intestine tube itself so that that part of the small intestine tube which is not threaded by the innermost of said cutting members may be conducted away from the moving parts of said apparatus for collection, wherein said guide means comprise a weighted rod privotally secured to the solid portion of said horn and a hook-shaped member disposed beneath said weighted rod.

2. Apparatus as defined in claim 1 wherein said rotary cutting blade which is adapted to effect an initial severing of the small intestine tube from the stomach is provided with a housing, said housing having a recess therein exposing part of the rotary blade and wherein the curved leading end of the horn is located relative to said recess so that severing of the small intestine tube is effected by the rotary blade rotating in said recess.

3. Apparatus as defined in claim 2 wherein said housing has a second recess provided therein in order that the stomach of the beast with the small intestine tube affixed may be introduced to the rotating blade in said second recess in order to effect an initial severing of said small intestine tube from said stomach.

4. Apparatus as defined in claim 1 wherein said co-operating further rollers through which said severed threads are fed for beating comprise a smooth upper table roller and a pair of toothed lower rollers, the first of which is a control roller and the second of which is a beater roller.

5. Apparatus as defined in claim 1 wherein said apparatus is provided with a further final pick-off roller in order that gold beater strand threads proceeding from said co-operating further rollers may be fed over said final pickoff roller for collection.

6. Apparatus as defined in claim 4 wherein said pulling rollers are 2 inches diameter rollers driven to rotate at approximately 360 r.p.m., the smooth upper table roller is of 4 inches diameter and driven to rotate at 200 r.p.m., the control roller is of 3 inches diameter and driven to rotate at 265 r.p.m. and the toothed beater roller is of 4 inches diameter and driven to rotate at 1,250 r.p.m.

* * * * *